United States Patent
Davis et al.

(10) Patent No.: US 6,305,708 B2
(45) Date of Patent: *Oct. 23, 2001

(54) AIR BAG DEPLOYMENT SYSTEM AND METHOD FOR MONITORING SAME

(75) Inventors: Benjamin R. Davis, Chandler; Ronald V. DeLong, Mesa, both of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,160

(22) Filed: Jun. 29, 1998

(51) Int. Cl.[7] .................................................. B60R 21/32
(52) U.S. Cl. ........................................................... 280/735
(58) Field of Search .................... 280/735, 737, 280/734; 102/201

(56) References Cited

U.S. PATENT DOCUMENTS

| | | | |
|---|---|---|---|
| 4,384,734 | * 5/1983 | Yasui | 280/735 |
| 4,917,014 | 4/1990 | Loughry et al. | 102/201 |
| 4,968,965 | * 11/1990 | Naitou et al. | 340/436 |
| 5,007,661 | * 4/1991 | Lenzen | 280/735 |
| 5,099,761 | 3/1992 | Betts et al. | 102/201 |
| 5,136,946 | * 8/1992 | Soltz et al. | 102/201 |
| 5,138,946 | * 8/1992 | Soltz et al. | 102/201 |
| 5,404,820 | 4/1995 | Hendrix | 102/201 |
| 5,406,889 | 4/1995 | Letendre et al. | 102/201 |
| 5,460,405 | * 10/1995 | Faigle et al. | 280/735 |
| 5,460,407 | * 10/1995 | Stuckle | 280/741 |
| 5,501,486 | * 3/1996 | Fujita et al. | 280/735 |
| 5,564,737 | * 10/1996 | Ito et al. | 280/735 |
| 5,571,994 | 11/1996 | Norton | 174/65 R |
| 5,602,734 | * 2/1997 | Kithil | 364/424.055 |
| 5,652,389 | * 7/1997 | Schaps et al. | 73/643 |
| 5,660,413 | 8/1997 | Bergerson et al. | 280/741 |
| 5,683,103 | 11/1997 | Blackburn et al. | 280/735 |
| 5,734,318 | * 3/1998 | Nitschke et al. | 340/438 |
| 5,747,696 | * 5/1998 | Kwun et al. | 73/728 |
| 5,748,075 | * 5/1998 | Dirmeyer et al. | 340/436 |
| 5,785,347 | * 7/1998 | Adolph et al. | 280/735 |
| 5,792,959 | * 8/1998 | Marchant | 73/730 |
| 5,829,782 | * 11/1998 | Breed et al. | 280/735 |
| 5,835,873 | * 10/1998 | Darby et al. | 701/45 |
| 5,847,472 | * 12/1998 | Byon | 307/10.1 |
| 5,859,583 | * 1/1999 | Mayumi et al. | 340/436 |
| 5,869,745 | * 2/1999 | Schroeder et al. | 73/31.04 |
| 5,914,458 | * 6/1999 | Folsom et al. | 102/201 |
| 5,927,752 | * 7/1999 | Brandin | 280/735 |
| 5,928,300 | * 7/1999 | Rogers et al. | 701/45 |
| 5,936,313 | * 8/1999 | Cook, Jr. et al. | 307/10.1 |
| 5,964,815 | * 10/1999 | Wallace et al. | 701/45 |
| 5,979,934 | * 11/1999 | Shirk et al. | 280/735 |

* cited by examiner

*Primary Examiner*—Eric Culbreth
*Assistant Examiner*—L. Lum
(74) *Attorney, Agent, or Firm*—Patricia S. Goddard

(57) ABSTRACT

An air bag deployment system (20) includes a microcontroller (21), an inflator (23), and an inflator sensor (24). The inflator sensor (24) is adjacent to the inflator (23) and monitors the firing of the inflator (23). The inflator sensor (24) monitors the firing of a squib (36) of the inflator (23). The inflator sensor (24) transmits an inflator firing signal to the microcontroller (21) when the squib (36) of the inflator (23) is activated. In the absence of the inflator firing signal, a backup firing signal is generated by the microcontroller (21) and is transmitted to a backup squib (37).

19 Claims, 1 Drawing Sheet

AIR BAG DEPLOYMENT SYSTEM AND METHOD FOR MONITORING SAME

FIELD OF THE INVENTION

The present invention relates, in general, to automobile safety systems and, more particularly, to air bag deployment systems.

BACKGROUND OF THE INVENTION

Air bag deployment systems for automotive vehicles generally employ an inflator to inflate and deploy the air bag. Conventional inflators typically include a pyrotechnic material. When burned, the pyrotechnic material produces a nontoxic gas which is used to inflate the air bag. Some inflators utilize a pressurized gas to inflate the air bag.

Inflators are activated by initiators. Initiators are also referred to as squibs or ignitors. Initiators are devices which, when activated, ignite the inflator's pyrotechnic material so as to produce a gas. In the case of a pressure inflator, when its initiator is activated, a projectile is propelled through a membrane to release the inflator's pressurized gas.

In today's air bag systems, inflator firing is confirmed by observing the condition of the inflator control circuitry connected to the squib of the inflator. Previous methods for indirectly determining if an inflator is activated include determining if a control switch of the control circuitry is closed, measuring the current provided to the squib, or measuring the resistivity of the squib. These indirect methods assume that a dud or misfire did not occur in the squib and do not directly determine if an inflator failure occurred.

Inadvertent firing of the inflator is a potential problem in some air bag systems which can result in an air bag being unintentionally deployed. This can be caused by electrostatic discharge energy or Radio Frequency (RF) signals such as signals from a radar or high powered radio transmitters. This type of energy can be transmitted to the squib and inadvertently heat the pyrotechnic material of the squib to its flame temperature.

Accordingly, it would be advantageous to have an air bag deployment system and method that prevents inadvertent air bag deployment. It would be of further advantage to have a system and method for directly detecting inflator failure and that activates alternate safety devices in the event of inflator failure.

DETAILED DESCRIPTION OF THE DRAWINGS

Generally, the present invention provides an air bag deployment system and a method for monitoring the air bag deployment system. The air bag deployment system includes an inflator for inflating and deploying an air bag. In addition, the air bag deployment system includes an inflator sensor for monitoring the inflator to determine if the air bag deployed. In particular, the inflator sensor monitors the activation of an initiator of the inflator to directly determine if the inflator is activated or fired. This is accomplished by monitoring either the ignition area of the inflator or the surface of the initiator. If the inflator failed to activate, then an alternate safety device such as, for example, a backup inflator, can be fired in order to deploy the air bag.

Figure 1:
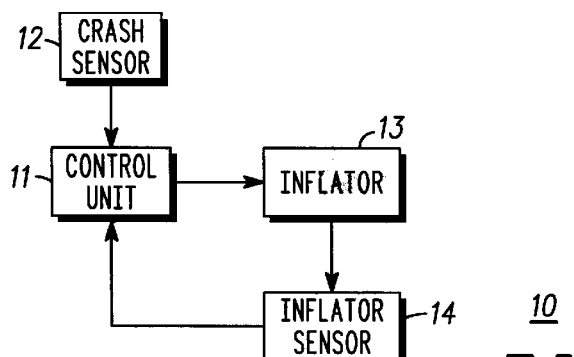
FIG. 1 is a block diagram of a portion of an air bag deployment system in accordance with a first embodiment of the present invention.

FIG. 1 is a block diagram of a portion of an air bag deployment system 10 in accordance with a first embodiment of the present invention. Generally, system 10 includes a control circuit 11, a crash sensor 12 connected to control circuit 11, an inflator 13 connected to control circuit 11, and an inflator sensor 14 connected to inflator 13 and to control circuit 11. More particularly, control circuit 11 has a crash input connected to an output of crash sensor 12, a sensor input connected to an output of inflator sensor 14, and an output connected to a firing input of inflator 13. Inflator 13 has an activation output connected to a sensing input of inflator sensor 14.

In operation, air bag deployment system 10 is used in, for example, an automotive vehicle to deploy an air bag in the event of a crash. Suitable types of sensors for crash sensor 12 include proximity sensors, accelerometers, pressure sensors, optical sensors, or the like. Crash sensor 12 detects a crash by sensing or measuring the deceleration of the vehicle and transmits a crash signal to control circuit 11. Control circuit 11 transmits a firing signal to inflator 13 in response to the crash signal received from crash sensor 12. Inflator 13 is activated or fired when it receives the firing signal from control circuit 11. In one example, inflator 13 is activated by burning a pyrotechnic material (not shown) so as to produce a gas for inflating an air bag (not shown). Inflator sensor 14 monitors inflator 13. Specifically, inflator sensor 14 monitors the activation of inflator 13 to directly determine if inflator 13 is activated or fired. This is accomplished by monitoring either the ignition chamber (not shown) of the inflator or the surface (not shown) of inflator 13. Inflator sensor 14 generates a firing sensing signal when it senses the activation of inflator 13. In this example, inflator sensor 14 transmits the firing sensing signal to control circuit 11. In the absence of the firing sensing signal from inflator sensor 14, i.e., when the firing sensing signal is not received, control circuit 11 transmits a backup firing signal to inflator 13 to activate inflator 13.

Suitable devices for control circuit 11 include a microcontroller, a microprocessor, or the like. Suitable devices for inflator sensor 14 include a microphone, a thermal sensor, a light or optical sensor, a pressure sensor, an accelerometer, a transducer, or the like. These types of devices can be used to monitor inflator 13 and to detect whether inflator 13 has been activated. For example, when a pyrotechnic material is burned, heat is generated and can be sensed by a thermal sensor coupled to the surface of inflator 13. Alternatively, a light sensor can be used to sense the light generated by the burning of the pyrotechnic material. In another example, when inflator 13 is activated, a sound wave is generated from the ignition chamber of inflator 13 and is sensed by a microphone. If inflator 13 uses pressurized gas to inflate the air bag, a pressure sensor is used to measure the change in atmospheric pressure of the ignition chamber of inflator 13 or gaseous output of inflator 13.

Although the output of inflator sensor 14 is illustrated as being connected to control circuit 11, this is not a limitation of the present invention. The output of inflator sensor 14 can be connected to inflator 13 for activating inflator 13 or the output can be coupled to an alternate safety device such as, for example, a backup inflator, in the event of a misfire by inflator 13.

Figure 2:
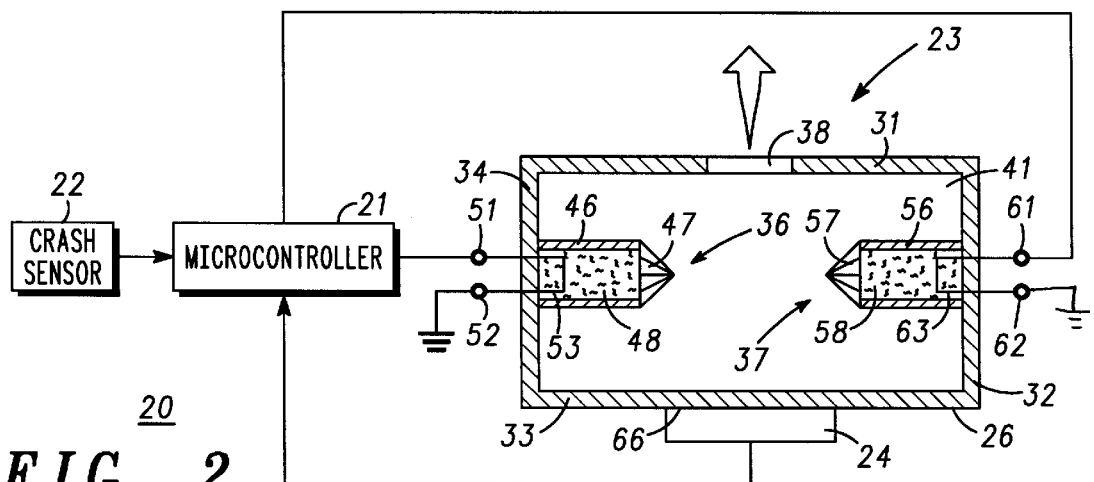
FIG. 2 illustrates in partial block form and partial schematic form, a portion of an air bag deployment system in accordance with a second embodiment of the present invention.

FIG. 2 illustrates in partial block form and partial schematic form, a portion of an air bag deployment system 20 in accordance with a second embodiment of the present invention. System 20 includes a microcontroller 21, a crash sensor 22 connected to microcontroller 21, an inflator 23 connected to microcontroller 21, and an inflator sensor 24 adjacent to inflator 23 and connected to microcontroller 21.

A cross-sectional view of inflator 23 is shown in FIG. 2. Inflator 23 has a surface 26, a plurality of walls 31, 32, 33, and 34, a squib 36 connected to wall 34, a squib 37 connected to wall 32, and a vent 38 located in wall 31. Walls 31, 32, 33, and 34 cooperate to form an ignition area 41. Although not shown, those skilled in the art are aware that area 41 is filled with a secondary pyrotechnic material. Squib 36 has sidewalls 46, a rupturable hermetic seal 47 at one end of sidewalls 46, and a primary pyrotechnic material 48 within sidewalls 46. In addition, squib 36 has terminals 51 and 52 and a low resistive wire 53 with a first terminal connected to terminal 51 and a second terminal connected to terminal 52. Similarly, squib 37 has sidewalls 56, a rupturable hermetic seal 57 at one end of sidewalls 56, and a primary pyrotechnic material 58 within sidewalls 56. In addition, squib 37 has terminals 61 and 62 and a low resistive wire 63 with a first terminal connected to terminal 61 and a second terminal connected to terminal 62. Terminals 52 and 62 are coupled for receiving a power supply voltage or source of operating potential such as, for example, ground potential.

Now referring to inflator sensor 24, which may be, for example, a microphone, which is coupled to surface 26 of inflator 23. Microphone 24 converts acoustic energy into electrical energy. Microphone 24 has an input surface 66 acoustically coupled to surface 26 and an output connected to microcontroller 21. In other words, microphone 24 is coupled to surface 26 of inflator 23 for sensing acoustic energy at surface 26. Microcontroller 21 has a crash input connected to an output of crash sensor 22, an inflator sensor input connected to the output of microphone 24, a first firing output connected to terminal 51 of squib 36, and a second firing output connected to terminal 61 of squib 37.

Crash sensor 22 detects a crash and transmits a crash signal to the crash input of microcontroller 21. Microcontroller 21 transmits a first firing signal to terminal 51 of squib 36 in response to the crash signal received from crash sensor 12. During normal operation, squib 36 is fired when it receives the first firing signal from microcontroller 21. As the first firing signal is conducted through wire 53, heat is generated and causes the ignition and burning of pyrotechnic material 48. During the burning of pyrotechnic material 48, seal 47 is ruptured and ignites the secondary pyrotechnic material (not shown) which in turn produces a gas that flows through area 41 and through vent 38 for inflating an air bag (not shown). Microphone 24 acoustically monitors surface 26 and senses the acoustic energy produced by the firing of squib 36. For example, microphone 24 senses the sound waves generated by the gases formed when inflator 23 is fired. Microphone 24 generates a firing sensing signal when inflator 23 is fired. It should be noted that the firing sensing signal generated by microphone 24 is also referred to as the inflator firing signal or the squib firing signal. The firing sensing signal is transmitted from the output of microphone 24 to the inflator sensor input of microcontroller 21 and indicates that squib 36 fired properly.

During a failure of squib 36, i.e., when squib 36 does not fire upon receiving the first firing signal from microcontroller 21, microphone 24 does not sense acoustic energy and does not generate a firing sensing signal. The absence of the firing sensing signal from microphone 24, i.e., when the firing sensing signal is not received by microcontroller 21, indicates that squib 36 misfired or failed. Microcontroller 21 generates a second firing signal when the firing sensing signal is not received and transmits the second firing signal to terminal 61 of squib 37. Squib 37 is fired when it receives and conducts the second firing signal from microcontroller 21. As the second firing signal is conducted through wire 63, heat is generated and causes the ignition and burning of pyrotechnic material 58. During the burning of pyrotechnic material 58, seal 57 is ruptured and ignites the secondary pyrotechnic material (not shown) which in turn produces a gas that flows through area 41 and through vent 38 for inflating the air bag. Microphone 24 senses the acoustic energy produced by the firing of squib 37 and generates a firing sensing signal which is transmitted from the output of microphone 24 to the inflator sensor input of microcontroller 21. Alternatively, if squib 36 does not fire in response to the first firing signal, microcontroller 21 can attempt to activate squib 36 by transmitting the second firing signal to terminal 51 of squib 36. In addition, microcontroller 21 can attempt to fire an alternative safety device such as, for example, a backup inflator (not shown). It should be noted that the second firing signal can also be referred to as a backup firing signal and that squib 37 can also be referred to as a backup squib.

Although inflator sensor 24 is described as a microphone, this is not a limitation of the present invention. Alternatively, inflator sensor 24 can be a thermal sensor which is thermally coupled to surface 26 of inflator 23. In other words, inflator sensor 24 is coupled to surface 26 of inflator 23 for sensing thermal energy at surface 26. For example, when squib 36 is fired, the burning of pyrotechnic material 48 and the secondary pyrotechnic material (not shown) generates heat which is transferred to surface 26 of inflator 23.

Figure 3:
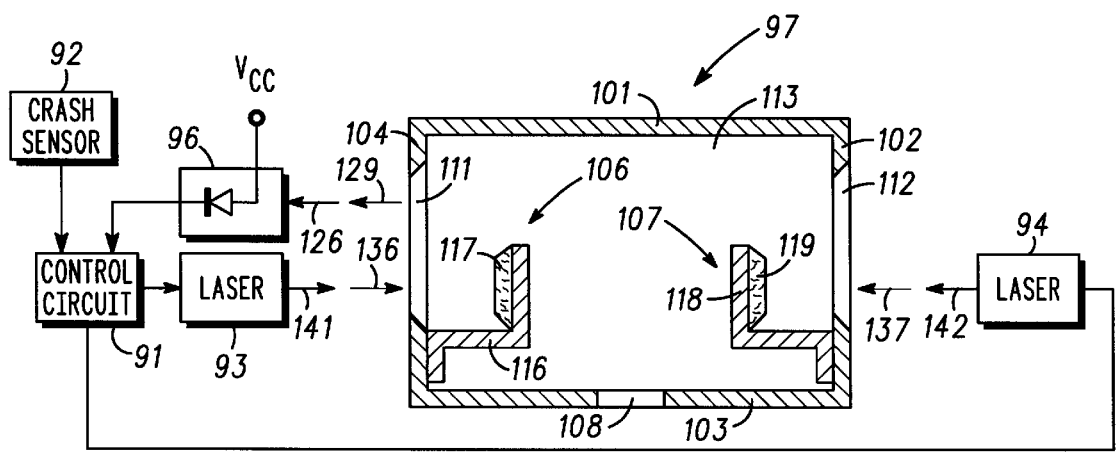
FIG. 3 illustrates in partial block form and partial schematic form, a portion of an air bag deployment system in accordance with a third embodiment of the present invention.

FIG. 3 illustrates in partial block form and partial schematic form, a portion of an air bag deployment system 90 in accordance with a third embodiment of the present invention. Generally, system 90 includes a control circuit 91, a crash sensor 92, lasers 93 and 94, and an inflator sensor 96, wherein crash sensor 92, lasers 93 and 94, and inflator sensor 96 are each connected to control circuit 91. In addition, system 90 includes an inflator 97, wherein lasers 93 and 94 and inflator sensor 96 are each adjacent to inflator 97. In particular, control circuit 91 has a crash input connected to an output of crash sensor 92, an inflator sensor input connected to an output of inflator sensor 96, a first firing output connected to an input of laser 93, and a second firing output connected to an input of laser 94.

A cross-sectional view of inflator 97 is shown in FIG. 3. Inflator 97 has a plurality of walls 101, 102, 103, and 104, a squib 106 connected to wall 104, a squib 107 connected to wall 102, and a vent 108 located in wall 103. In addition, inflator 97 has an optical window 111 located in wall 104 and an optical window 112 located in wall 102. Walls 101, 102, 103, and 104 cooperate to form an ignition chamber 113. Although not shown, those skilled in the art aware that chamber 113 is filled with a secondary pyrotechnic material. Squib 106 has a squib flag 116 and a primary pyrotechnic material 117 connected to a portion of squib flag 116. Likewise, squib 107 has a squib flag 118 and a primary pyrotechnic material 119 connected to a portion of squib flag 118.

Now referring to inflator sensor 96, which may be, for example, a light sensor having a sensor input (denoted by an arrow 126), an output connected to the inflator sensor input of control circuit 91, and a bias input coupled for receiving a source of operating potential such as, for example, Vcc. Light sensor 96 can be comprised of photo diodes, photo transistors, photo cells, or the like. In this example, light sensor 96 is illustrated as a photo diode. Light sensor 96 converts light energy into electrical energy and is optically coupled to optical window 111. In other words, light sensor 96 is adjacent and aligned to optical window 111 so that radiation is conducted from ignition chamber 113 to light sensor 96. Thus, for sensing light (denoted by an arrow 129) transmitted from ignition chamber 113, light sensor 96 can be contacting optical window 111 or light sensor 96 can be spaced apart from optical window 111. In addition, light sensor 96 can be optically coupled to optical window 111 via an optical fiber (not shown). In this embodiment, photo diode 96 is spaced apart from optical window 111. Photo diode 96 modulates its current based on the amount of incident light received at its sensor input 126. Photo diode 96 generates a firing sensing signal when it senses light from ignition chamber 113.

Lasers 93 and 94 generate light beams (respectively denoted by arrows 136 and 137). Optical window 111 is transparent at the frequency of light for igniting pyrotechnic material 117, which is the frequency of light beam 136. Similarly, optical window 112 is transparent at the frequency of light for igniting pyrotechnic material 119, which is the frequency of light beam 142.

In operation, crash sensor 92 detects a crash and transmits a crash signal to the crash input of control circuit 91. Control circuit 91 transmits a first firing signal to laser 93 in response to the crash signal received from crash sensor 92. Laser 93 generates light beam 136 in response to the first firing signal from control circuit 91. Light beam 136 is transmitted from the output (denoted by arrow 141) of laser 93 to pyrotechnic material 117 through optical window 111. During normal operation, squib 106 is fired when light beam 136 contacts and ignites pyrotechnic material 117. During the burning of pyrotechnic material 117, the secondary pyrotechnic material (not shown) in chamber 113 ignites which in turn produces a gas that flows from ignition chamber 113 and through vent 108 for inflating an air bag (not shown). Light sensor 96 optically monitors ignition chamber 113 and senses the light energy produced by the firing of squib 106. In addition, light sensor 96 generates a firing sensing signal which is transmitted from the output of light sensor 96 to the inflator sensor input of control circuit 91. The firing sensing signal indicates that squib 106 fired properly.

In the event of a failure such as, for example, when squib 106 does not fire in response to control circuit 91 transmitting a first firing signal to laser 93, light sensor 96 does not sense light energy and does not generate a firing sensing signal. The absence of the firing sensing signal from light sensor 96, i.e., when the firing sensing signal is not received by control circuit 91, indicates that squib 106 misfired or failed. Control circuit 91 generates a second firing signal when the firing sensing signal is not received and transmits a firing signal to the input of laser 94. Laser 94 generates light beam 137 in response to the second firing signal from control circuit 91. Light beam 137 is transmitted from the output (denoted by an arrow 142) of laser 94 to pyrotechnic material 119 through optical window 112. Squib 107 is fired when light beam 137 contacts and ignites pyrotechnic material 119. During the burning of pyrotechnic material 119, the secondary pyrotechnic material (not shown) in chamber 113 ignites which in turn produces a gas that flows from ignition chamber 113 and through vent 108 for inflating the air bag.

Light sensor 96 senses the light energy produced by the firing of squib 107 and generates a firing sensing signal. This signal is transmitted from the output of light sensor 96 to the inflator sensor input of control circuit 91 and indicates that squib 107 fired properly. Alternatively, if squib 106 does not fire in response to the first firing signal, then control circuit 91 can attempt to activate squib 106 by transmitting the second firing signal to laser 93.

Although not shown, laser 93 can be a semiconductor laser and can be integrated with light sensor 96 to form an integrated semiconductor device. Squibs 106 and 107 are electrically isolated from external electrostatic discharge energy and Radio Frequency (RF) signals, thereby preventing inadvertent firing of squibs 106 and 107.

In order to prevent inadvertent squib firings from light other than light beams 136 and 137, optical windows 111 and 112 can be made to be transparent to light having predetermined frequencies and to block out all other light. Further, optical window 111 can be replaced with two optical windows, wherein one window is transparent at the frequency of the light energy produced by the firing of squibs 106 and 107 and the other window is transparent at the frequency of light beams 136 and 137.

By now it should be appreciated that an air bag deployment system and a method for monitoring the air bag deployment system have been provided. An advantage of an optically based system is that it prevents inadvertent inflator firings caused by electrostatic discharge energy. Another advantage of the present invention is that it provides a system and method for directly monitoring the inflator and detecting inflator failure. Further, the present invention provides a system and method for activating alternate safety devices in the event of inflator failure. In addition, the present invention is compatible with multi-level air bag deployment systems that have inflators with multiple squibs.

What is claimed is:

1. An air bag deployment system, comprising:
   an inflator; and
   an inflator sensor directly connected to the inflator for acoustically monitoring a surface of the inflator to determine if a squib within the inflator is activated.

2. The air bag deployment system of claim 1, further comprising a control circuit coupled to the inflator.

3. The air bag deployment system of claim 1, wherein the inflator sensor is a microphone.

4. The air bag deployment system of claim 1, wherein the inflator sensor is an acoustic sensor for sensing acoustic energy produced by the activation of the squib.

5. A method for monitoring an air bag system, comprising:
   transmitting a firing signal to an inflator of the air bag system;
   monitoring a surface of the inflator to determine if a pyrotechnic material within the inflator has ignited; and
   using an inflator sensor of the air bag system to monitor the inflator and detect ignition, wherein the inflator sensor is directly connected to the inflator.

6. The method of claim 5, wherein monitoring the surface of the inflator includes acoustically monitoring the surface of the inflator by sensing acoustic energy produced by the ignition of the pyrotechnic material.

7. The method of claim 5, further including:
   activating a squib of the inflator when the firing signal is received by the inflator; and
   transmitting a backup firing signal to the inflator in the absence of the firing signal from the inflator sensor.

8. An air bag deployment system, comprising:

an inflator; and an inflator sensor directly connected to the inflator for thermally monitoring a surface of the inflator to determine if a pyrotechnic material within the inflator has ignited.

9. The air bag deployment system of claim 8, wherein the inflator sensor is a thermal sensor for sensing thermal energy produced by the igniting of the pyrotechnic material within the inflator.

10. An air bag deployment system, comprising:

an inflator; and an inflator sensor adjacent to the inflator for sensing light produced by firing of a squib within the inflator.

11. The air bag deployment system of claim 10, further comprising:

a control circuit coupled to the inflator sensor; and a laser coupled to the control circuit and adjacent to the inflator.

12. The air bag deployment system of claim 10, wherein the inflator sensor is a photo diode.

13. The air bag deployment system of claim 10, wherein the light has a frequency and the inflator has a wall and comprises an optical window in the wall of the inflator, wherein the optical window is transparent at the frequency of the light produced by the firing of the squib and the inflator sensor receives the light through the optical window.

14. The air bag deployment system of claim 10, wherein the inflator sensor is a light sensor for sensing light produced by igniting of a pyrotechnic material within the inflator.

15. The air bag deployment system of claim 10, wherein the inflator sensor is spaced apart from the inflator.

16. A method for sensing activation of an inflator, comprising:

activating a squib of an inflator; and optically monitoring a chamber within the inflator to determine if a pyrotechnic material within the inflator has ignited.

17. The method of claim 16, wherein optically monitoring includes sensing light produced by the igniting of the pyrotechnic material.

18. The method of claim 16, further including:

transmitting a firing signal to the inflator to activate the squib;

transmitting an inflator firing signal in response to sensing the light to indicate ignition of the pyrotechnic material; and transmitting a backup firing signal to activate a backup squib to ignite the pyrotechnic material in the absence of the inflator firing signal.

19. The method of claim 16, further including activating a backup squib if activating of the squib fails.

* * * * *